US012730089B2

(12) United States Patent
Meijer et al.

(10) Patent No.: US 12,730,089 B2
(45) Date of Patent: Sep. 8, 2026

(54) ELECTROCHEMICAL SENSOR MEASUREMENT UNIT

(71) Applicant: NXP B.V., Eindhoven (NL)

(72) Inventors: Rinze Ida Mechtildis Peter Meijer, Herkenbosch (NL); Pramod Rajan Kesavelu Shekar, Bangalore (IN)

(73) Assignee: NXP B.V., Eindhoven (NL)

( * ) Notice: Subject to any disclaimer, the term of this patent is extended or adjusted under 35 U.S.C. 154(b) by 248 days.

(21) Appl. No.: 18/544,987

(22) Filed: Dec. 19, 2023

(65) Prior Publication Data

US 2024/0201129 A1 Jun. 20, 2024

(30) Foreign Application Priority Data

Dec. 19, 2022 (IN) ............................ 202211073583

(51) Int. Cl.
*G01N 27/416* (2006.01)

(52) U.S. Cl.
CPC ................................ *G01N 27/4163* (2013.01)

(58) Field of Classification Search
CPC ........ G01N 27/00; G01N 27/02; G01N 27/22; G01N 27/24; G01N 27/327; G01N 27/3271; G01N 27/3272; G01N 27/3273; G01N 27/3274; G01N 27/4163; A61B 5/1495; A61B 5/14532; A61B 5/1451; A61B 2560/0242; A61B 2560/0276
See application file for complete search history.

(56) References Cited

U.S. PATENT DOCUMENTS 8,114,268 B2 2/2012 Wang et al.
9,213,010 B2 12/2015 Yang et al.
10,321,844 B2 6/2019 Varsavsky et al.
(Continued)

FOREIGN PATENT DOCUMENTS

WO WO-2022225109 A1 10/2022
WO WO-2022225109 A9 10/2022

OTHER PUBLICATIONS

Global Market Insights, Inc.; “Automotive Sensors Market to value USD 55 BN by 2030; Global Market Insights Inc.” Sep. 14, 2021; 6 pages; https://www.globenewswire.com/en/news-release/2021/09/14/2296342/0/en/Automotive-Sensors-Market-to-value-USD-55-BN-by-2030-Global-Market-Insights-Inc.html.
(Continued)

*Primary Examiner* — Gurpreet Kaur

(57) ABSTRACT

An electrochemical sensor measurement unit is described including a sensor degradation signature unit and a processing unit coupled to the sensor degradation signature unit. The processing unit includes a processor first input configured to be coupled to a sensor output of an electrochemical sensor and a processor first output configured to be coupled to a sensor input of an electrochemical sensor. The processing unit is configured to apply a stimulus signal to the sensor input; receive an electrochemical sensor signal via the sensor output. The processing unit may then determine at least one sensor parameter at one or more time values from the received sensor signal. The processing unit determines a predicted lifetime value corresponding to an expected remaining lifetime of the electrochemical sensor dependent on the sensor degradation signature and the at least one sensor parameter.

20 Claims, 8 Drawing Sheets

(56) References Cited

U.S. PATENT DOCUMENTS

| | | | | |
|---|---|---|---|---|
| 10,682,084 | B2 | 6/2020 | Böhm et al. | |
| 2007/0170073 | A1* | 7/2007 | Wang | A61B 5/1495 205/775 |
| 2017/0181673 | A1 | 6/2017 | Nogueira et al. | |
| 2020/0096477 | A1* | 3/2020 | Duellman | G01N 27/4165 |

OTHER PUBLICATIONS

Allied Market Research; "IoT Sensors Market to Garner $141.80 Billion, Globally, by 2030 at 28.1% CAGR : Allied Market Research"; Sep. 8, 2021; 5 pages, https://www.prnewswire.com/news-releases/iot-sensors-market-to-garner-141-80-billion-globally-by-2030-at-28-1-cagr-allied-market-research-301371405.html.

Ghoreishizadeh, Sara S. et al.; "Study of Electrochemical Impedance of a Continuous Glucose Monitoring Sensor and its Correlation with Sensor Performance"; IEEE Sensors Letters; vol. 2, No. 1; Mar. 2018; 4 pages.

Panjan, Peter et al.; "Determination of stability characteristics for electrochemical biosensors via thermally accelerated ageing"; Talanta, Elsevier; vol. 170; Apr. 2017; 6 pages.

Helton, Kristen L. et al.; "Biomechanics of the Sensor-Tissue Interface- Effects of Motion, Pressure, and Design on Sensor Performance and Foreign Body Response-Part II: Examples and Application"; Journal of Diabetes Science and Technology; vol. 5, No. 3; May 2011; 10 pages.

* cited by examiner

100

150

200

550

ELECTROCHEMICAL SENSOR MEASUREMENT UNIT

CROSS-REFERENCE TO RELATED APPLICATIONS

This application claims the priority under 35 U.S.C. § 119 of Indian Patent Application number 202211073583, filed on 19 Dec. 2022, the contents of which are incorporated by reference herein.

FIELD

This disclosure relates to an electrochemical sensor measurement unit for sensor lifetime prediction and method of lifetime prediction of an electrochemical sensor.

BACKGROUND

Electrochemical sensors are used in a variety of industrial and health care applications for the analysis of gases and liquids, for example for CO detection, water quality analysis and the chemical composition of motor oil. An example use of electrochemical sensor is in continuous glucose monitoring (CGM) systems for people with diabetes. A CGM patch including an electrochemical sensor provides a signal corresponding to the level of glucose in the interstitial fluid. A processor connected to the CGM patch processes the sensor signal and gives a measure of the glucose level in the interstitial fluid. The lifetime of CGM patches is limited to 7 days up to 14 days, after which the CGM patch needs to be replaced by the patch user. The wear duration is a predefined time set by the manufacturers, based on the limited lifetime of the electrochemical sensor.

SUMMARY

Various aspects of the disclosure are defined in the accompanying claims. In a first aspect there is provided an electrochemical sensor measurement unit comprising: a sensor degradation signature unit; a processing unit coupled to the sensor degradation signature unit and further comprising: a processor first input configured to be coupled to a sensor output of an electrochemical sensor; a processor first output configured to be coupled to a sensor input of an electrochemical sensor; and wherein the processing unit is configured to: apply a stimulus signal to the sensor input; receive an electrochemical sensor signal via the sensor output; determine at least one sensor parameter at one or more time values from the electrochemical sensor signal; determine a predicted lifetime value corresponding to an expected remaining lifetime of the electrochemical sensor dependent on the sensor degradation signature, and the at least one sensor parameter.

In one or more embodiments, the electrochemical sensor measurement unit may further comprise: an environmental parameter input configured to be coupled to an environmental sensor; wherein the processing unit further comprises: a processor second input coupled to the environmental parameter input; and is further configured to: receive an environmental attribute corresponding to at least one of a temperature value, a pressure value and a vibration value; and determine the predicted lifetime value dependent on the environmental attribute.

In one or more embodiments, the electrochemical sensor measurement unit may further comprise: an environmental attribute module coupled between the environmental parameter input and the processor second input and configured to: receive an environmental sensor signal on the environmental parameter input, the environmental sensor signal corresponding to at least one of a sensed temperature, pressure and vibration; determine the environmental attribute from the environment sensor signal; and provide the environmental attribute to the processing unit.

In one or more embodiments, the electrochemical sensor measurement unit may further comprise: a sensor parameter extraction module having a sensor parameter extraction output coupled to the processor first input, wherein the sensor parameter extraction module is configured to receive the electrochemical sensor signal, extract at least one sensor parameter from the electrochemical sensor signal, and provide the at least one sensor parameter to the processing unit.

In one or more embodiments, the electrochemical sensor measurement unit may further comprise: a sensor fusion module configured to be coupled between a plurality of electrochemical sensors and the sensor parameter extraction module and configured to: receive the electrochemical sensor signal from a first electrochemical sensor of the plurality of electrochemical sensors; receive at least one further electrochemical sensor signal from a further electrochemical sensor of the plurality of electrochemical sensors; and to provide the electrochemical sensor signal and the at least one further electrochemical sensor signal to the sensor parameter extraction module; and wherein the sensor degradation signature unit comprises at least one sensor degradation signature for each of the plurality of electrochemical sensors.

In one or more embodiments, the at least one sensor parameter may comprise a set of impedance values and wherein the sensor degradation signature unit comprises a plurality of sets of reference parameters and an associated time value.

In one or more embodiments, the at least one sensor parameter may further comprise an environmental parameter value.

In one or more embodiments, the electrochemical sensor measurement unit may further comprise: an analog front-end circuit coupled to the processing unit and wherein a first output of the analog front-end circuit is configured to be coupled to the sensor input, a first input of the analog front-end circuit is configured to be coupled to the sensor output, and wherein the analog front-end circuit further comprises a stimulus signal generator and is configured in a sensor time prediction step to: generate the stimulus signal; output the stimulus signal on the processor first output; and detect the electrochemical sensor signal; and wherein the electrochemical sensor signal comprises a response of the electrochemical sensor to the stimulus signal.

In one or more embodiments, the processing unit may be further configured to determine a sensor health value from the set of impedance values, compare the sensor health value with a first threshold value and a second threshold value and in response to the sensor health value being between the first and second threshold values, to repeat the sensor time prediction step, and in response to the sensor health value being less than the second threshold value to indicate that the electrochemical sensor is invalid.

In one or more embodiments, the processing unit may be further configured to: determine a first sensor health value from a first set of impedance values measured at a first time; determine a second sensor health value from a second set of impedance values measured at a second time; and determine the predicted lifetime value from a difference between the first sensor health value and the second sensor health value.

In one or more embodiments, the electrochemical sensor measurement unit may be further configured to determine the at least one sensor parameter by at least one of electrochemical impedance spectroscopy, chronoamperometry, and square wave voltammetry.

In one or more embodiments, the sensor degradation signature unit may comprise a machine learning model configured to output the predicted lifetime value from the at least one sensor parameter, and wherein the processing unit, is configured to provide the at least one sensor parameter to the machine learning model and receive the predicted lifetime value from the machine learning model.

Embodiments of the electrochemical sensor measurement unit may be included in a continuous glucose monitoring (CGM) system including an electrochemical sensor comprising a glucose sensor.

In one or more embodiments, the electrochemical sensor measurement unit may further comprise a transceiver coupled to the processing unit. In one or more embodiments, the electrochemical sensor measurement unit may further comprise comprising an application control unit coupled between the processing unit and the transceiver.

In a second aspect, there is provided a method of predicting the remaining lifetime of an electrochemical sensor, the method comprising: applying a stimulus signal to a sensor input of the electrochemical sensor; receiving an electrochemical sensor signal via a sensor output of the electrochemical sensor; determining at least one sensor parameter at one or more time values from the electrochemical sensor signal; determining a predicted lifetime value corresponding to an expected remaining lifetime of the electrochemical sensor dependent on a sensor degradation signature, and the at least one sensor parameter.

In one or more embodiments, the method may further comprise: receiving an environmental attribute corresponding to at least one of a temperature value, a pressure value and a vibration value; and determining the predicted lifetime value dependent on the environmental attribute and the sensor degradation signature.

In one or more embodiments, the at least one sensor parameter may comprise a set of impedance values and wherein the sensor degradation signature comprises a plurality of sets of reference parameters and an associated time value.

In one or more embodiments, the method may further comprise in a sensor time prediction step: generating the stimulus signal; detecting the electrochemical sensor signal; and wherein the electrochemical sensor signal comprises a response of the electrochemical sensor to the stimulus signal.

In one or more embodiments, the method may further comprise: determining a sensor health value from the set of impedance values; comparing the sensor health value with a first threshold value and a second threshold value; in response to the sensor health value being between the first and second threshold values, repeating the sensor time prediction step; and in response to the sensor health value being less than the second threshold value, indicating that the electrochemical sensor is invalid.

BRIEF DESCRIPTION OF THE DRAWINGS

In the figures and description like reference numerals refer to like features. Embodiments are now described in detail, by way of example only, illustrated by the accompanying drawings in which.

Figure 1:
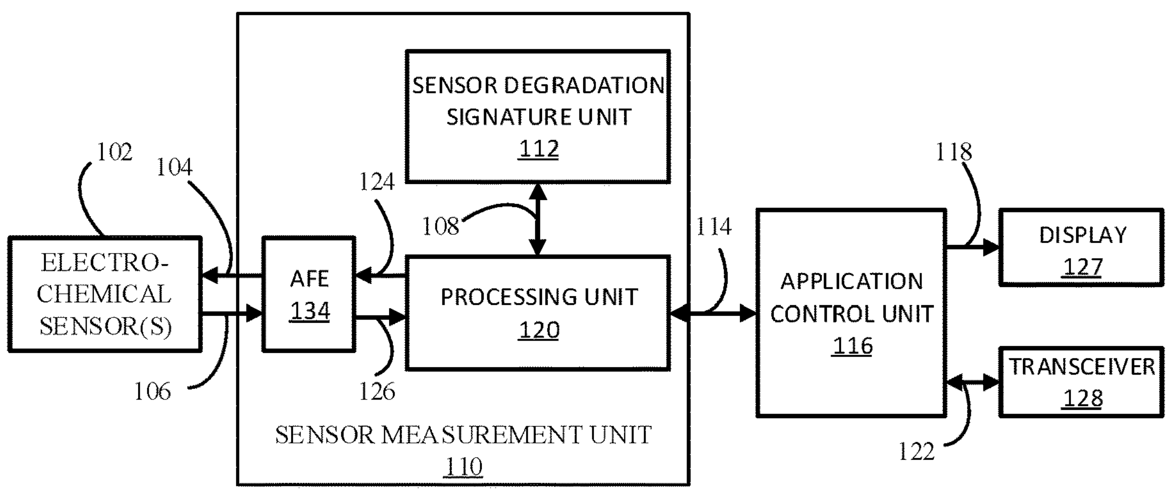
FIG. 1 shows an electrochemical sensor system including a sensor measurement unit according to an embodiment.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

FIG. 1 shows an electrochemical sensor system 100 including a sensor measurement unit 110 according to an embodiment. The sensor measurement unit 110 includes a sensor degradation signature unit 112, a processing unit 120, and an analog front-end circuit 134. One or more electrochemical sensors 102 may have a sensor input 104 connected to an output of the analog front-end circuit 134, and a sensor output 106 connected to an input of the analog front-end circuit 134. The analog front-end circuit 134 may have an input connected to a output 124 of the processing unit 120. The analog front-end circuit 134 may have an output connected to an input 126 of the processing unit 120. The processing unit 120 may have an interface 108 connected to a sensor degradation signature unit 112 which may include a memory. The processing unit 120 may also have a connection 114 to an application control unit 116. The application control unit 116 may have an output 118 connected to a display 127. The application control unit 116 may have a connection 122 to a transceiver 128. In some examples the processing unit 120 may connect directly to the transceiver 128 for communication to a further device (not shown) such as a mobile phone or other remote computing device which includes a display. In these examples, the application control unit 116 and the display 127 may be omitted.

In operation, the processing unit 120 may perform a sensor time prediction step by triggering the analog front-end via output 124 to generate a stimulus signal applied to sensor input 104. The stimulus signal is a time varying signal which is added to a fixed level corresponding to a bias level by the analog front-end circuit 134. The bias level is always applied during normal sensor operation. In some examples, the stimulus signal may be a sinusoidal signal which can have varying frequency. The analog front-end circuit 134 may convert the signal to an analog signal may apply the combined stimulus signal and bias to the sensor input 104 and detect the electrochemical sensor signal generated in response by the electrochemical sensor 102 via the sensor output 106. The stimulus signal may be a time varying current or voltage which may be digitized by the analog front-end 134 and provided to the processing unit input 126. The processing unit 120 may determine an impedance value from the electrochemical sensor signal. The stimulus signal may sweep through a number of different frequencies, which may for example include frequencies up to 100 KHz to obtain a set of impedance values using Electro-Impedance Spectroscopy (EIS) together with an associated time stamp. The processing unit 120 may determine the remaining lifetime for the sensor 102 by comparing the set of impedance values or a characteristic of the set of impedance values with a sensor degradation signature which may include a set of reference characteristics stored in the sensor degradation signature unit 112 together with an associated time value. In some examples a sensor degradation signature including set of reference characteristics labelled with an associate time value may be used to train a machine learning model which is then included in the sensor degradation signature unit 112. In these examples the processing unit 120 may provide the parameters extracted from the received sensor signal to the machine learning model via interface 108 which then outputs a predicted lifetime to the processing unit 120.

In some examples, after a stimulus signal has been applied and the sensor signal parameters extracted, the processing unit 120 may adjust the DC bias value. Adjusting the DC bias value may result for example in a corrected sensor setting to mitigate the impact of sensor degradation on sensor performance caused by ageing of the sensor. In some examples, other stimulus signals may be used, for example stimulus signals to measure sensor characteristics using Chronoamperometry or square-wave voltammetry.

The processing unit 120 may output the predicted lifetime to the application control unit 116. The application control unit 116 may control the operation of the sensor measurement unit 110, for example to control how often the normal sensor measurement operation is done, and how often the sensor lifetime prediction measurements are made. The time intervals between the sensor measurement operations and sensor lifetime prediction measurements may change over the lifetime of the electrochemical sensor. The application control unit 116 may output the predicted lifetime value to the display 127. The predicted lifetime value may include one or more of an estimated lifetime of sensors and an indication to represent the health condition of sensors, for example whether healthy, ageing or end of life for sensor.

The application control unit 116 may communicate to external devices via the RF transceiver 128. The external devices may include a display and may include one or more of a smartphone, wearable devices, electronic control units (ECUs) in vehicles, an IoT hub, cloud network or the like. Connectivity may, for example, be via near-field communication (NFC), Bluetooth low-energy (BLE), Wi-Fi and similar. In some examples, the sensor measurement unit 110 may be connected directly to the transceiver 128 for communication to external devices. In some examples, the application control unit 116 and display 127 may be omitted from the electrochemical sensor system 100.

The analog front-end circuit 134 may be implemented in hardware using known circuit configurations. The sensor degradation signature unit 112 may include a memory and be implemented in hardware or a combination of hardware and software. The processing unit 120 may be implemented in hardware or a combination of hardware and software.

Figure 2A:
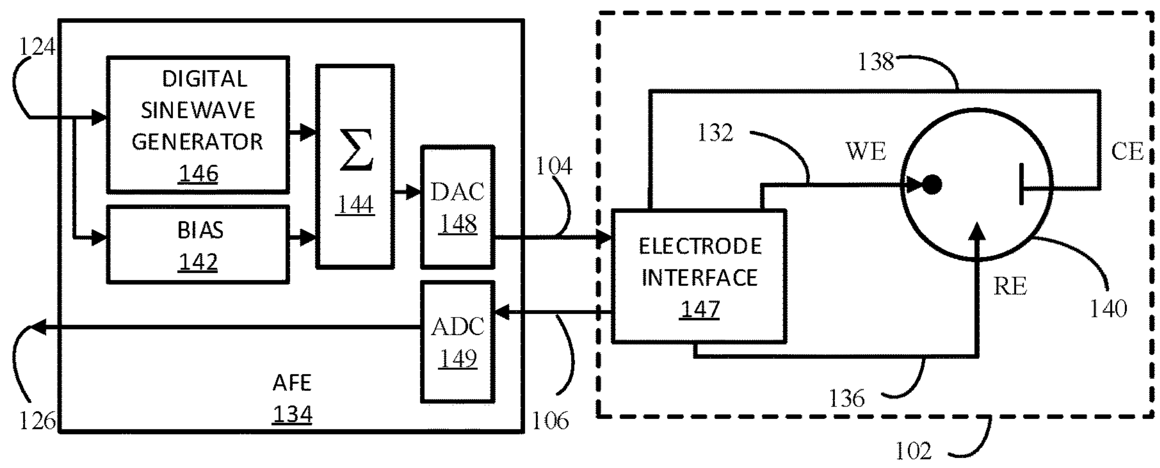
FIG. 2A an example implementation of the analog front-end circuit included in the sensor measurement unit of FIG. 1.

FIG. 2A shows an illustrates an example implementation of the analog front-end circuit 134 and the electrochemical sensor connections. The analog front-end circuit 134 may include a bias unit 142 and a digital sinewave generator 146 which may for example be implemented as a lookup table. The output of the digital sinewave generator 146 and the output of the bias unit 142 may be connected to an adder 144 which combines the stimulus signal and bias value the combined signal may be output via digital-to-analog converter (DAC) 148 to the sensor input 104. The electrochemical sensor 102 may include an electrode interface 147 connected to a sensor 140. The electrode interface 147 may be implemented using known circuit techniques. The electrode interface 147 may have a connection to the work electrode (WE) 132 of the sensor 140, the reference electrode (RE) 136 and the counter electrode (CE) 138. The digital sine-wave generator 146 may be used to generate a stimulus signal which may then be combined with a bias value from the bias unit 142 by the adder 144. The resulting combined signal may be provided to the analog front-end as previously described. The sensed signal from sensor output 106 may be digitized by analog to digital converter (ADC) 149 and provided to the processing unit input 126. It will be appreciated that in other examples, the electrode interface 147 may be part of the analog front-end circuit 134. In other examples one or more elements of the analog front-end circuit 134 and electrode interface 147 may be included in the processing unit 120.

The reaction with the compound to be sensed takes place at the work electrode 132. The counter electrode 138 shunts current away from the reference electrode 136 to endure a constant accurate potential difference between the WE 132 and the RE 136. The electrochemical sensor 102 as illustrated is commonly used for glucose measurement. In other applications a two terminal sensor may be used which omits the counter electrode 138. For two electrode sensors, the RE 136 provides a path for the reaction current for a two terminal sensor only having a work electrode and reference electrode.

Figure 2B:
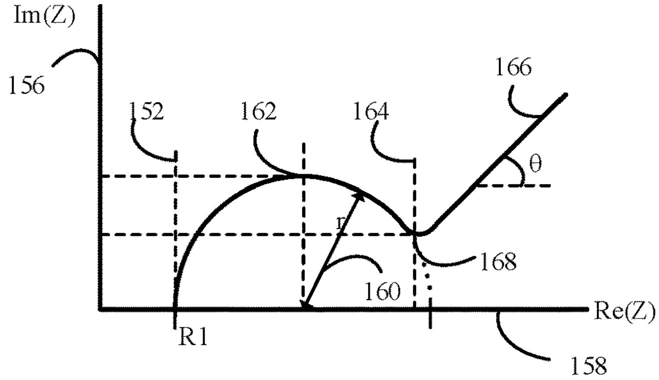
FIG. 2B shows an example Nyquist plot of the impedance variation over frequency of an electrochemical sensor.

FIG. 2B shows an example Nyquist plot 150 of the impedance variation over frequency for an electrochemical sensor which may be determined for example by EIS. Nyquist plot 150 corresponds to the response of an equivalent circuit of an electrochemical sensor for example the Randles model. The x-axis 158 is the real part of the complex impedance value, the y-axis 156 is the imaginary part of the complex impedance value. The Nyquist plot 150 has a number of characteristics. A semicircular portion intercepts the x-axis 158 at line 152 corresponding to value R1 which is equivalent to the frequency value being infinity. The semicircular portion has a peak value 162 and a radius 160 which, depending on the regularity of the semicircular portion may be constant or vary. Nyquist plot 150 shows an inflection point at 168 after which the plot has linear portion 166 having a positive gradient of angle θ with respect to the x-axis 158. The semicircular portion may be considered to be the part of the curve between dashed line 152 and dashed line 164. The linear portion 166 may be considered to be the segment following the inflection point 168. The values of one or more of the various characteristics of the Nyquist plot 150 determined from measurement of a reference electrochemical sensor may be included as reference parameters in a degradation signature and compared with measured values of impedance to determine the remaining lifetime of the electrochemical sensor 102.

Figure 3:
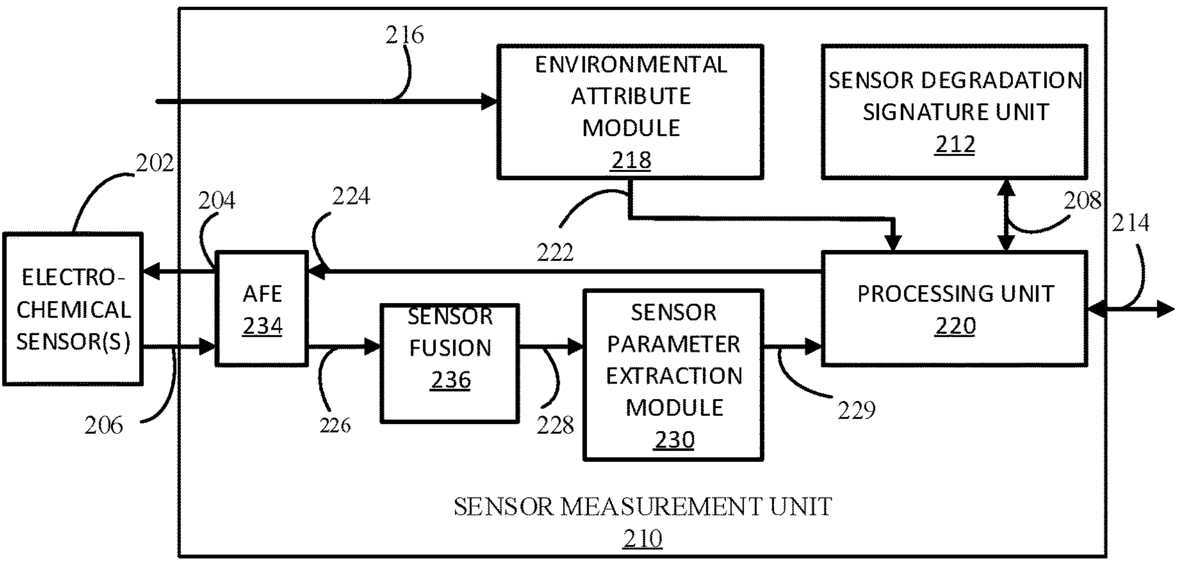
FIG. 3 illustrates an electrochemical sensor system including a sensor measurement unit according to an embodiment.

FIG. 3 shows an electrochemical sensor system 200 including a sensor measurement unit 210 according to an embodiment. The sensor measurement unit 210 includes a sensor degradation signature unit 212, a processing unit 220, a sensor fusion module 236, an environmental attribute module 218, a sensor parameter extraction module 230, and an analog front-end circuit 234. One or more electrochemical sensors 202 may have a sensor input 204 connected to an output of the analog front-end circuit 234, and a sensor output 206 connected to an input of the analog front-end circuit 234. The analog front-end circuit 234 may have an input connected to an output 224 of the processing unit 220. The analog front-end circuit 234 may have an output connected to an input 226 of the sensor fusion module 236. The sensor fusion module 236 may have an output 228 connected to an input of the sensor parameter extraction module 230. The sensor parameter extraction module 230 may have a sensor parameter extraction output connected to a first input 229 of the processing unit 220. The processing unit 220 may have an interface 208 connected to the sensor degradation signature unit 212 which may include a memory. The processing unit 220 may also have a connection 214 to a transceiver (not shown) or other circuitry (not shown). An environmental parameter input 216 may be connected to an input of the environmental attribute module 218. An environmental attribute module output may be connected to a processor second input 222 of the processing unit 220.

In operation, the sensor fusion module 236 may collect the sensed information from electrochemical sensors 202 and provide the combined sensor data to the sensor parameter extraction module 230. The sensor fusion module 236 may have a control input (not shown) connected to the processing unit 220.

The sensor parameter extraction module 230 may extract the parameters required to calculate and predict the lifetime of sensors, for example the impedance characteristics described in FIG. 2B, and provide the extracted data to the processing unit 220.

The sensor degradation signature unit 212 may include sensor degradation signatures for each of the electrochemical sensors and optionally multiple sets for different environmental parameter values. In some examples a sensor degradation signature including set of reference parameters labelled with an associate time value for each electrochemical sensor may be used to train a machine learning model which is then included in the sensor degradation signature unit 212. The sensor degradation signature unit 212 may operate in a similar way to sensor degradation signature unit 112.

The environmental attribute module 218 may receive one or more environmental sensor signals from environmental sensors (not shown) on the environmental parameter input 216. These environmental parameters may include but are not limited to one or more of temperature, pressure, vibration and movement, which may impact the lifetime of the electro-chemical sensors.

The processing unit 220 may apply a stimulus signal similarly to processing unit 120 and receive the real-time parameters of sensors from sensor fusion module 236, together with environmental parameters from the environmental attribute module 218. The sensor degradation signature may consist of sets of signatures for different values of environmental parameters. The processing unit 220 may evaluate the sensed parameters against the golden reference sensor degradation signature set corresponding to the environmental parameter value (for example temperature) to predict the lifetime of each of the sensors 202. The predicted lifetime status may be sent to an optional application specific processing unit (not shown) which may determine whether the sensed data is reliable and can be displayed to the users. For CGM systems, an indication may be provide as to whether the user should replace the sensor patch if the sensor quality is not as per the acceptable limits.

The analog front-end circuit 234 may be implemented in hardware using known circuit configurations. The sensor degradation signature unit 212 may include a memory and be implemented in hardware or a combination of hardware and software. The processing unit 220, sensor fusion module 236, sensor parameter extraction module 230 and environmental attribute module 218 may be implemented in hardware or a combination of hardware and software.

Figure 4A:
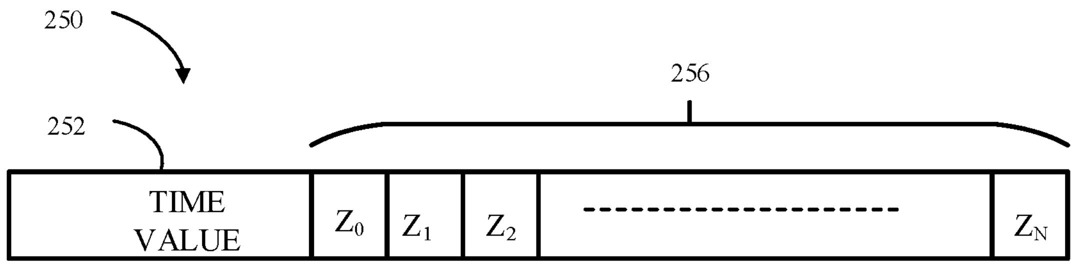
FIGS. 4A and 4B illustrates example data structures to store electrochemical impedance spectroscopy results in a sensor measurement unit according to an embodiment.
Figure 4B:
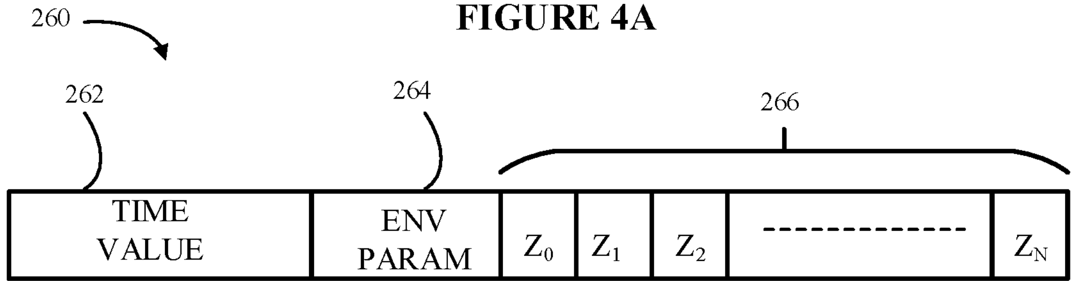

FIGS. 4A and 4B illustrates example data structures 250, 260 to store electrochemical impedance spectroscopy results in a sensor measurement unit according to an embodiment. Data structure 250 includes a time value field 252 and a set of impedance values 256 ($Z_0$, $Z_1$ . . . $Z_N$) determined from an EIS measurement. Each impedance value $Z_0$, $Z_1$ may be a complex value including a real value and imaginary value. Data structure 260 includes a time value field 262, an environmental parameter field 264 which may include one or more environmental parameter measurements and a set of impedance values 266 determined from an EIS measurement. Each impedance value $Z_0$, $Z_1$ may be a complex value including a real value and imaginary value.

Figure 4C:
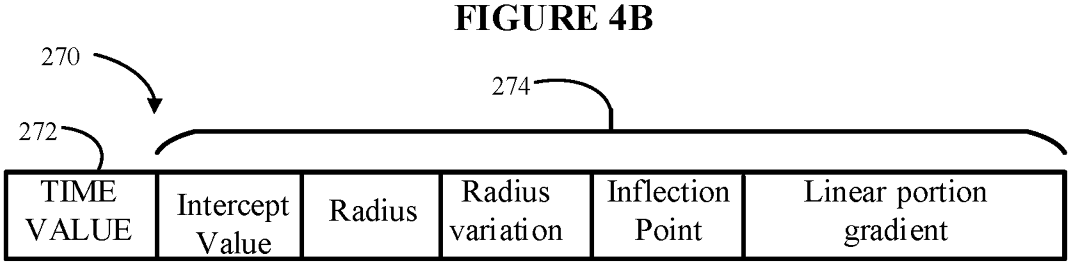
FIG. 4C illustrates a sensor degradation signature of electrochemical impedance spectroscopy based lifetime prediction according to an embodiment.

FIG. 4C illustrates a sensor degradation signature 270 of electrochemical impedance spectroscopy based lifetime prediction according to an embodiment. The sensor degradation signature 270 may include a table of values, each row including a time value 272 and a set of reference parameters 274 corresponding to the time value. The signature may include a number of reference parameters 274 corresponding to characteristics of the Nyquist impedance plot 150. As illustrated, this may include for example one or more of an intercept value R1, radius 160, radius variation, inflection point 168, and linear portion gradient θ. Other characteristics, for example the peak value 162 of the semi-circular portion of the Nyquist plot 150 may be used.

Figure 4D:
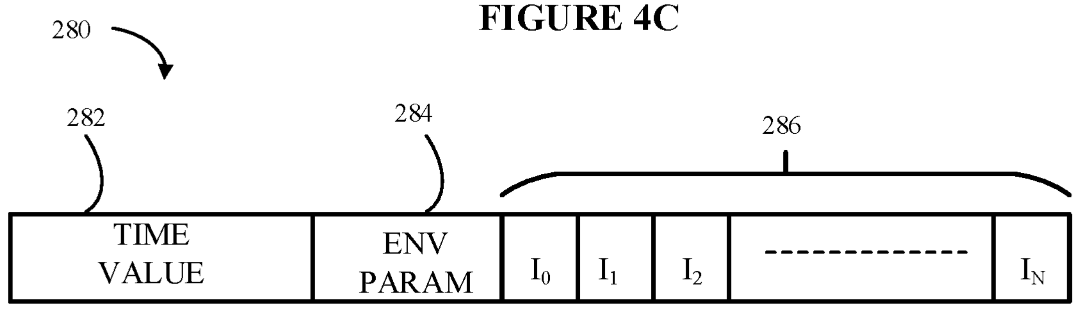
FIG. 4D illustrates an example data structure to store of chronoamperometry measurement results in a sensor measurement unit according to an embodiment

FIG. 4D illustrates an example data structure 280 for chronoamperometry measurement results in a sensor measurement unit according to an embodiment. Data structure 280 includes a time value field 282, an environmental parameter field 284, and a set of current values 286 ($I_0$, $I_1$ . . . $I_N$) determined from a chronoamperometry measurement.

Figure 4E:
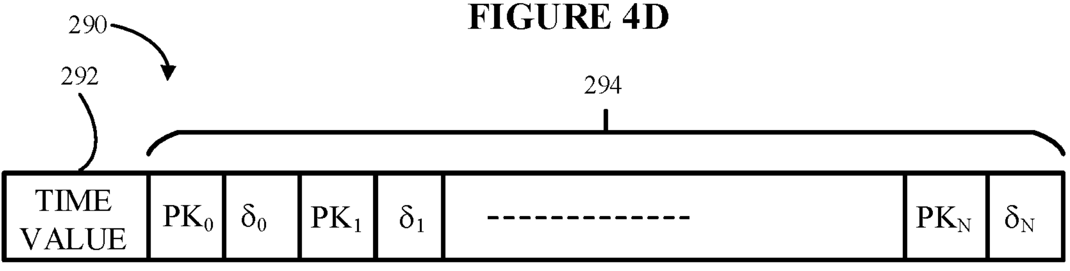
FIG. 4E illustrates a sensor degradation signature of chronoamperometry based lifetime prediction according to an embodiment.

FIG. 4E illustrates a sensor degradation signature 290 for chronoamperometry based lifetime prediction according to an embodiment. The sensor degradation signature 290 may include a time value 292 and an associated set of reference parameters 294 which may for example consist of one or more pulse peak values PK0, PK1 and corresponding pulse decay times 80, 81 corresponding to a response of a reference electrochemical sensor to a chronoamperometry stimulus signal.

Figure 5:
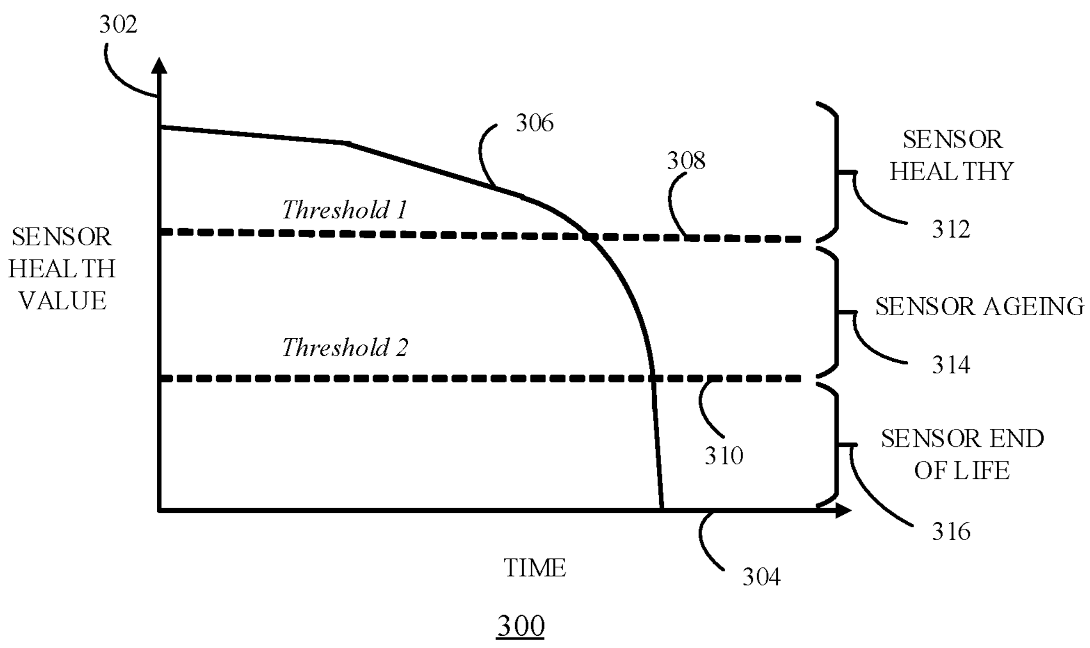
FIG. 5 illustrates a sensor degradation profile for a sensor measurement unit according to an embodiment.

FIG. 5 shows an example sensor degradation profile 300. The x-axis 304 is time and the y-axis 302 may be a sensor health value corresponding to a degradation signature value, for example intercept value at a particular time value, or a combination of degradation signature parameters. In some examples the sensor health value may for example be a normalized value between 0 and 1, 0 and 100 derived from a combination of degradation signature parameters. The sensor health value 306 decreases over time. In a first region 312 above a first threshold value 308, the sensor may be considered healthy. In a second region 314, below a first threshold value 308 but above a second threshold value 310, the sensor may be considered ageing. For sensor health values below the second threshold value 310, the sensor may be considered to be in an end of life region 316. In some examples, the sensor lifetime prediction step may only be implemented after a predetermined time has elapsed.

Figure 6:
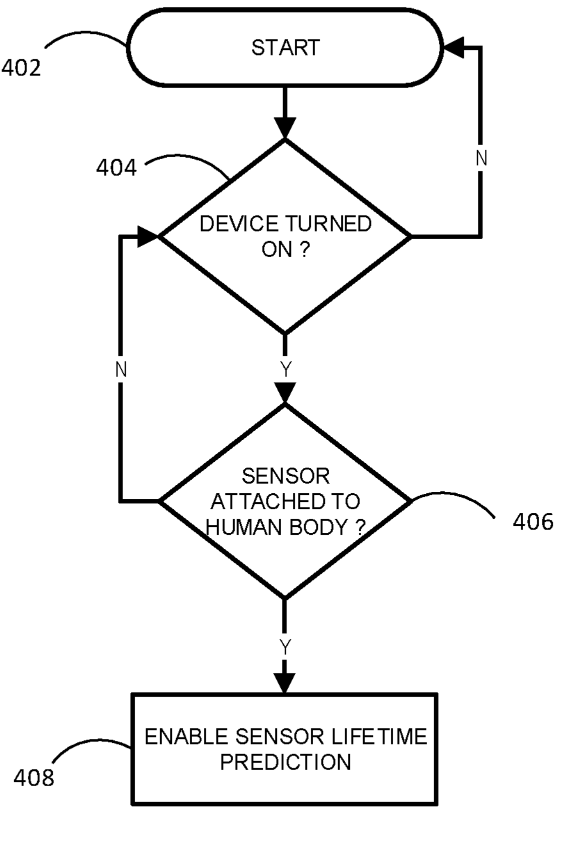
FIG. 6 shows an operational flowchart for a sensor measurement unit according to an embodiment.

FIG. 6 shows a method of initialisation 400 of a sensor measurement unit for a glucose sensor according to one or more embodiments. In step 402 the method starts. In step 404 a check is made to see whether the device is turned on. If the device is turned on the method proceeds to step 406 where check is made to determine if the sensor is attached to the human body. This check may be for example, by hydration for a CGM patch. If the sensor is not attached then the method returns to step 404. If the sensor is attached, then the method proceeds to step 408 and the sensor lifetime prediction is enabled.

Figure 7:
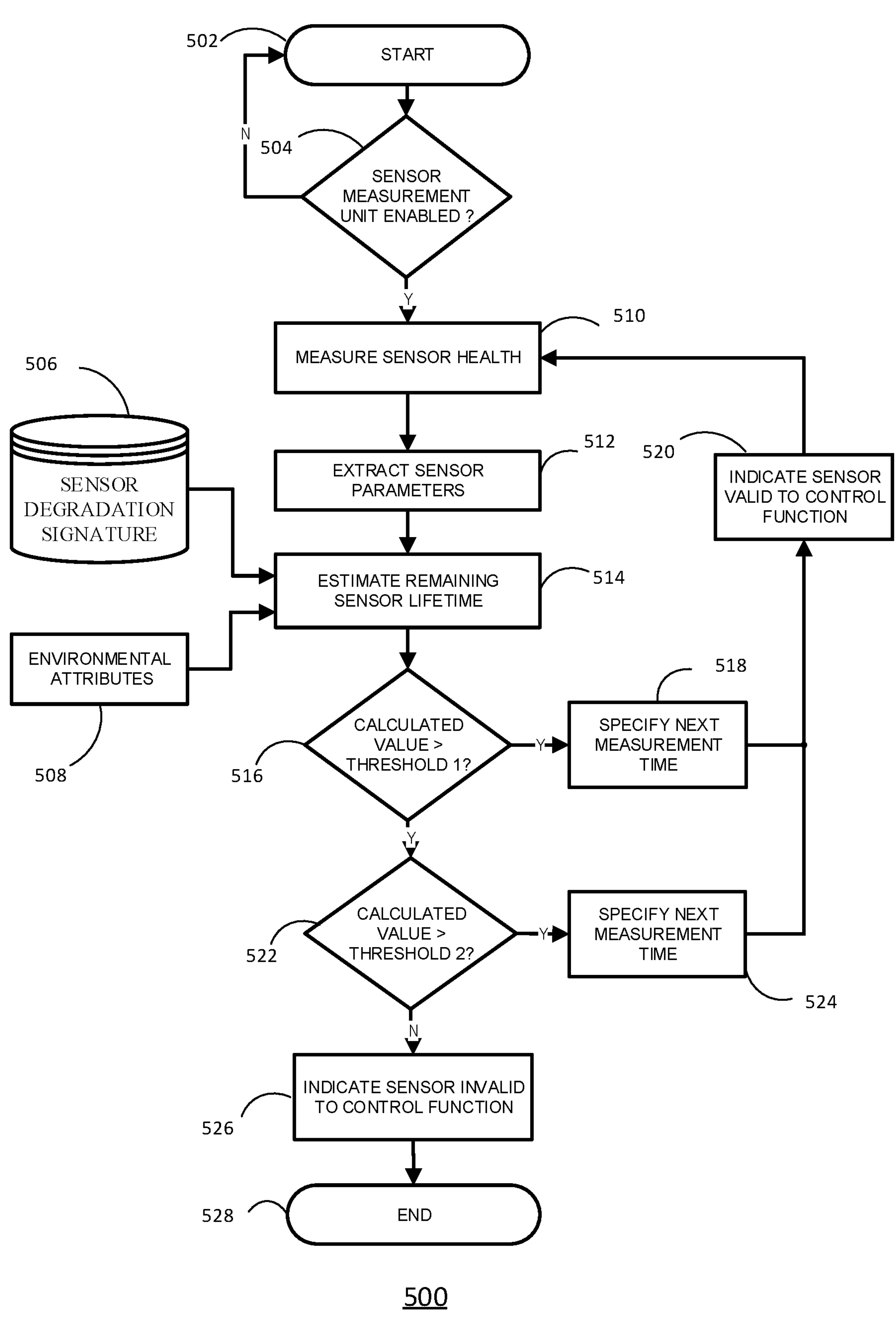
FIG. 7 shows an operational flowchart for a sensor measurement unit according to an embodiment.

FIG. 7 shows a method 500 of sensor lifetime prediction for a glucose sensor according to an embodiment. In step 502 the method starts. In step 504, a check is made to determine whether the sensor measurement unit is enabled. If the sensor measurement unit is not enabled, the method returns to step 502. If the sensor measurement unit is enabled, the method proceeds to step 510 and the sensor health is measured. In step 512 sensor parameters are extracted from the sensor health measurement. These sensor parameters may be for example the results of an EIS measurement resulting in a set of impedance values or a set of current values, for example determined by chronoamperometry or square-wave voltammetry. In step 514 the remaining sensor lifetime may be estimated based on the sensor degradation signature 506 and optionally environmental attributes 508 which may include one or more attributes such as a temperature value, pressure value, and a vibration value. In step 516, the method may estimate whether the remaining lifetime is greater than a first threshold value. If this value is greater than the first threshold value, then the sensor health may be considered as healthy, and the method may proceed to step 518. Step 518 specifies the next measurement time which may be for example after 1 day. The method then indicates in step 520 that the sensor is valid. After step 520 the method may return to step 510 and measure the sensor health after the specified time duration in step 518 has passed. Returning now to step 516, if the calculated value is less than the first threshold value, the method proceeds to step 522 and a comparison is made between a calculated value for the lifetime and a second threshold value. If the calculated value is greater than the second threshold value, the method may proceed to step 524 and specify the next measurement time which may be for example after a few hours. The method then indicates in step 520 that the sensor is valid. After step 520 the method may return to step 510 and measure the sensor health after the specified time duration in step 524 has passed. Returning to step 522, if the calculated values less than the second threshold, the method may proceed to step 526 and indicate the sensor is invalid to the control function. After step 526, the method may end at step 528.

Figure 8:
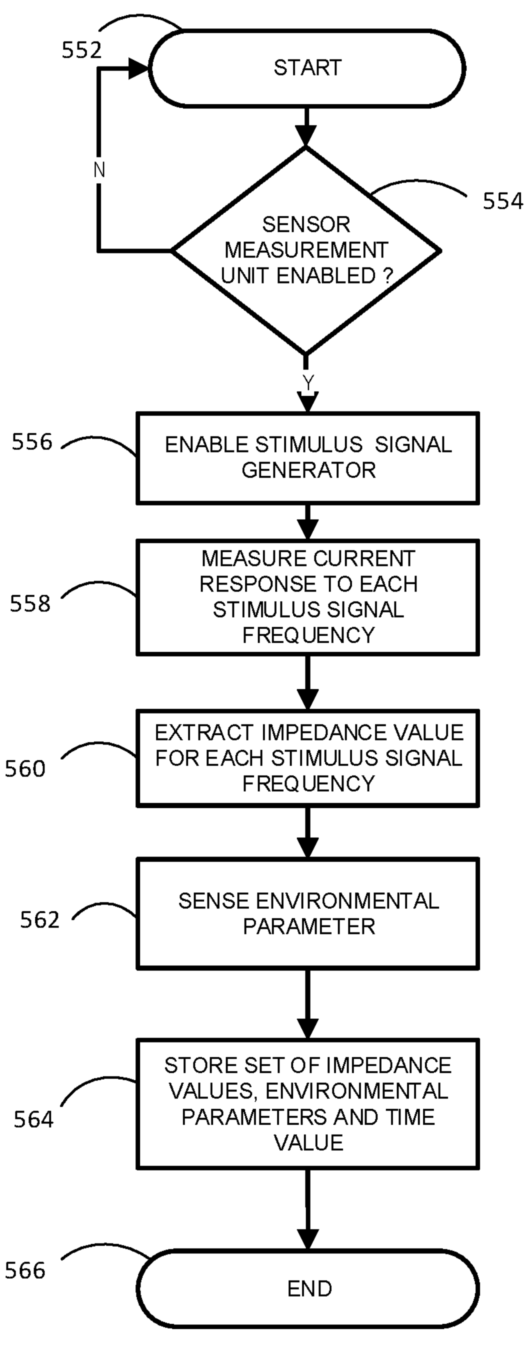
FIG. 8 shows a method of measuring data using electrochemical impedance spectroscopy for sensor lifetime prediction.

FIG. 8 shows a method 550 of capturing sensor health check parameters using EIS. The method 550 may for example be implemented by sensor measurement units 110, 210. In step 552 the method starts. At step 554, the method checks to see whether the sensor measurement unit is enabled. If the sensor measurement unit is not enabled, the method returns to step 552. Otherwise the method proceeds to step 556 and a stimulus signal generator is enabled. In step 558, the current response to each stimulus signal frequency may be measured. In step 560 an impedance value may be extracted for each stimulus signal frequency. In step 562 an environmental parameter may be sensed. In step 564 the set of impedance values, environmental parameters and an associated time value may be stored. In step 566 the method ends.

Figure 9:
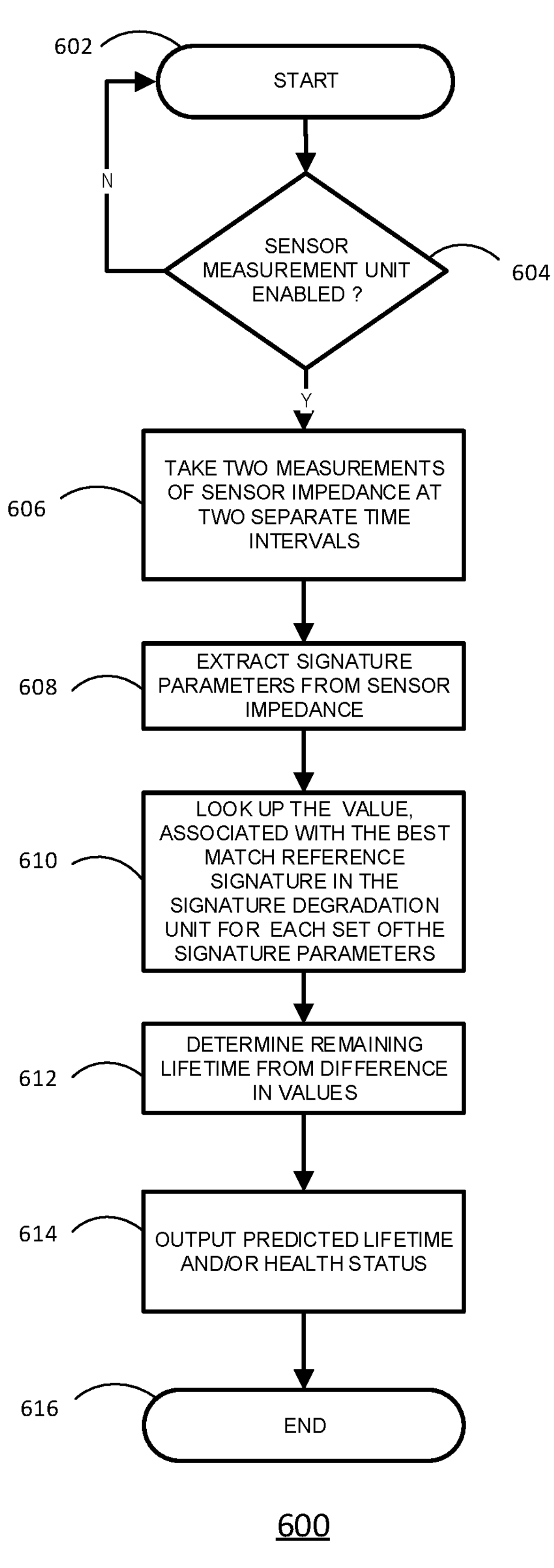
FIG. 9 shows a method of sensor lifetime prediction according to an embodiment.

FIG. 9 shows a method 600 for predicting an electrochemical sensor lifetime according to one or more embodiments. The method 600 may for example be implemented by sensor measurement units 110, 210. In step 602, the method starts. At step 604, the method checks to see whether the sensor measurement unit is enabled. If the sensor measurement unit is not enabled, the method returns to step 602. Otherwise the method proceeds to step 606 in which two measurements of sensor impedance may be taken at two separate time intervals. In some examples more than two measurements may be taken at more than two separate time intervals. In step 608, the signature parameters may be extracted from the sensor impedance. In step 610 the signature degradation signature value having the best fit to the extracted signature parameters may be determined together with the associated time value. This may be done for each of the two sets of measurements. In step 612 the remaining lifetime may be determined from the difference in the two time values. In step 614, the predicted lifetime and/or health status may be provided to the user for example by outputting the predicted lifetime and/or health status to a display. In step 616, the method may finish.

Figure 10:
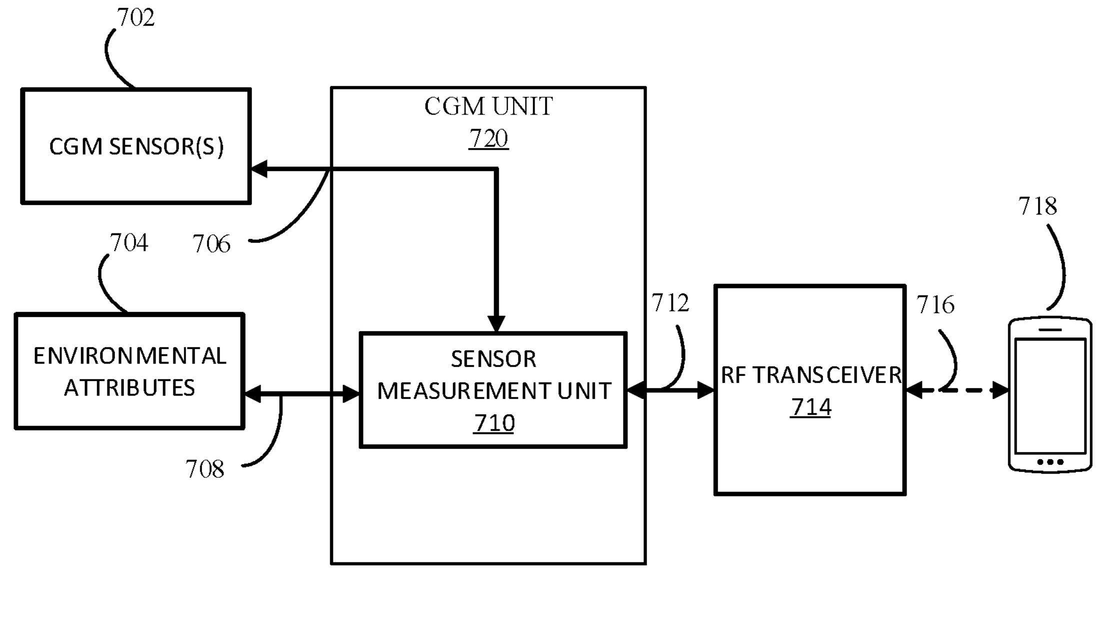
FIG. 10 shows a continuous glucose monitor unit including a sensor measurement unit according to an embodiment.

FIG. 10 shows a continuous glucose monitoring system 700 according to an embodiment. The CGM system 700 includes a CGM unit 720 including a sensor measurement unit 710 which may be implemented for example by sensor measurement unit 110, 210, and/or using any of the methods described herein. One or more CGM sensors 702 may be connected by connection 706 to the sensor measurement unit 710. One or more environmental attributes sensors 704 for may be connected by connection 708 to the sensor measurement unit 710. The sensor measurement unit may be connected by connection 712 to an RF transceiver 714. The RF transceiver 714 may communicate via a wireless link 716 to a further device 718 which may for example be a mobile phone.

CGM Sensors 702 may implement the basic function of the CGM patch, and may include the sensor frontend circuitry connected to the electrochemical sensors that determine the glucose level of the patient. This sensing may be done continuously for example a new value every minute and the data may be provided to the CGM unit 720.

The CGM Unit 720 may perform multiple individual processing tasks including continuously processing the sensed glucose information from the CGM sensors 702 and storing the processed data. The CGM Unit 720 may continuously monitor whether the sensed glucose information is within the acceptable limits of threshold levels from the latest sensed data. The CGM Unit 720 may trigger an alert unit (not shown) to alert the user whenever the sensed glucose information is not within the predefined acceptable limits. The CGM Unit 720 may receive the medicine properties from a smart insulin injection pen or smart insulin pump (not shown) via the wireless link 716 and calculate the amount of insulin to be injected by considering the latest sensed glucose level on the human body. The CGM Unit 720 may transmit calculated details of insulin to be injected to the pen through via the wireless link 716. The sensor measurement unit 710 may estimate and predict the lifetime of sensors using the methods and apparatus described herein and indicate the health status of sensors to users. The sensor information may then be transmitted to the further device 718 such as a mobile phone or other mobile device which may then display the information to the user. A user may then take appropriate action based on the status to replace the CGM sensor 702.

Embodiments described herein may predict the lifetime of electrochemical sensors which may use a statistical approach which may include training a machine learning model. This may also ensure the data collected through the sensors are reliable. For CGM systems, this may help patients to rely on the data collected by sensors, to determine whether the sensor device can still be trusted. Embodiments described may allow a more accurate determination of the remaining lifetime of an electrochemical sensor. For electrochemical sensors, this may allow replacement of the sensor based on the condition of the sensor rather than a predetermined timescale. For CGM patch sensors, this may allow the CGM patch sensor to be used safely for longer periods of time.

The characteristics data extracted from sensors may be evaluated against a golden reference signature, which may also be referred to a sensor degradation signature, for predicting the remaining lifetime of an electrochemical sensor. In some examples the sensor degradation signature may include sets of signatures for different values of environmental parameters, for example temperature.

Embodiments described may include electro-chemical sensor lifetime predictors such as CGM sensors, IoT sensor products in predictive maintenance of machines in industry and automotive sensor applications for example to predict battery lifetime.

An electrochemical sensor measurement unit is described including a sensor degradation signature unit and a processing unit coupled to the sensor degradation signature unit. The processing unit includes a processor first input configured to be coupled to a sensor output of an electrochemical sensor and a processor first output configured to be coupled to a sensor input of an electrochemical sensor. The processing unit is configured to apply a stimulus signal to the sensor input; receive an electrochemical sensor signal via the sensor output. The processing unit may then determine at least one sensor parameter at one or more time values from the received sensor signal. The processing unit determines a predicted lifetime value corresponding to an expected remaining lifetime of the electrochemical sensor dependent on the sensor degradation signature and the at least one sensor parameter.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

We claim:

1. An electrochemical sensor measurement unit comprising:

a sensor degradation signature unit;

a processing unit coupled to the sensor degradation signature unit and further comprising:

a processor first input configured to be coupled to a sensor output of an electrochemical sensor;

a processor first output configured to be coupled to a sensor input of an electrochemical sensor; and wherein the processing unit is configured to:

apply a set of stimulus signals to the sensor input;

receive a set of electrochemical sensor signals via the sensor output;

determine a set of sensor parameters at a corresponding set of time values from the electrochemical sensor signals;

wherein together the set of stimulus signals, the set of electrochemical sensor signals, and the set of sensor parameters form a sensor degradation signature;

determine a predicted lifetime value corresponding to an expected remaining lifetime of the electrochemical sensor by comparing the sensor degradation signature to a sensor degradation reference signature;

wherein the sensor degradation reference signature includes a set of reference sensor parameters that were generated at an earlier time by applying the set of stimulus signals to the electrochemical sensor.

2. The electrochemical sensor measurement unit of claim 1 further comprising an environmental parameter input configured to be coupled to an environmental sensor, wherein the processing unit further comprises:

a processor second input coupled to the environmental parameter input; and is further configured to:

receive an environmental attribute corresponding to at least one of a temperature value, a pressure value and a vibration value; and determine the predicted lifetime value dependent on the environmental attribute.

3. The electrochemical sensor measurement unit of claim 2 further comprising:

an environmental attribute module coupled between the environmental parameter input and the processor second input and configured to:

receive an environmental sensor signal on the environmental parameter input, the environmental sensor signal corresponding to at least one of a sensed temperature, pressure and vibration;

determine the environmental attribute from the environment sensor signal; and provide the environmental attribute to the processing unit.

4. The electrochemical sensor measurement unit of claim 1 further comprising a sensor parameter extraction module having a sensor parameter extraction output coupled to the processor first input, wherein the sensor parameter extraction module is configured to:

receive the electrochemical sensor signal;

extract at least one sensor parameter from the electrochemical sensor signal;

and provide the at least one sensor parameter to the processing unit.

5. The electrochemical sensor measurement unit of claim 4 further comprising a sensor fusion module configured to be coupled between a plurality of electrochemical sensors and the sensor parameter extraction module and configured to:

receive the electrochemical sensor signal from a first electrochemical sensor of the plurality of electrochemical sensors;

receive at least one further electrochemical sensor signal from a further electrochemical sensor of the plurality of electrochemical sensors; and provide the electrochemical sensor signal and the at least one further electrochemical sensor signal to the sensor parameter extraction module; and wherein the sensor degradation signature comprises at least one sensor degradation signature for each of the plurality of electrochemical sensors.

6. The electrochemical sensor measurement unit of claim 1, wherein the set of sensor parameters and the set of reference sensor parameters include a set of impedance values, and wherein the sensor degradation signature unit includes a plurality of sets of reference parameters and their associated time values.

7. The electrochemical sensor measurement unit of claim 6 wherein the set of sensor parameters further comprises an environmental parameter value.

8. The electrochemical sensor measurement unit of claim 6 further comprising an analog front-end circuit coupled to the processing unit, and wherein a first output of the analog front-end circuit is configured to be coupled to the sensor input, a first input of the analog front-end circuit is configured to be coupled to the sensor output, and wherein the analog front-end circuit further comprises a stimulus signal generator and is configured in a sensor time prediction step to:

generate the set of stimulus signals;

output the set of stimulus signals on the processor first output; and detect the electrochemical sensor signal; and wherein the electrochemical sensor signal comprises a response of the electrochemical sensor to the set of stimulus signals.

9. The electrochemical sensor measurement unit of claim 8, wherein the processing unit is further configured to determine a sensor health value from the set of impedance values, compare the sensor health value with a first threshold value and a second threshold value and, in response to the sensor health value being between the first and second threshold values, to repeat the sensor time prediction step, and in response to the sensor health value being less than the second threshold value to indicate that the electrochemical sensor is invalid.

10. The electrochemical sensor measurement unit of claim 9, wherein the processing unit is further configured to:

determine a first sensor health value from a first set of impedance values measured at a first time;

determine a second sensor health value from a second set of impedance values measured at a second time; and determine the predicted lifetime value from a difference between the first sensor health value and the second sensor health value.

11. The electrochemical sensor measurement unit of claim 1, wherein the electrochemical sensor measurement unit is configured to determine the set of sensor parameters by at least one of electrochemical impedance spectroscopy, chronoamperometry, and square wave voltammetry.

12. The electrochemical sensor measurement unit of claim 11 wherein the sensor degradation signature unit includes a machine learning model configured to output the predicted lifetime value from the set of sensor parameters, and wherein the processing unit, is configured to provide the set of sensor parameters to the machine learning model and receive the predicted lifetime value from the machine learning model.

13. A continuous glucose monitoring, CGM, system comprising the electrochemical sensor measurement unit of claim 1 coupled to an electrochemical sensor, wherein the electrochemical sensor comprises a glucose sensor.

14. An electrochemical sensor system comprising the electrochemical sensor measurement unit of claim 1 and further comprising a transceiver coupled to the processing unit.

15. A method of predicting the remaining lifetime of an electrochemical sensor, the method comprising:

applying a set of stimulus signals to a sensor input of the electrochemical sensor;

receiving a set of electrochemical sensor signals via a sensor output of the electrochemical sensor;

determining set of sensor parameters at a corresponding set of time values from the electrochemical sensor signals;

determining a predicted lifetime value corresponding to an expected remaining lifetime of the electrochemical sensor by comparing a sensor degradation signature to a sensor degradation reference signature;

wherein the sensor degradation reference signature includes a set of reference sensor parameters that were generated at an earlier time by applying the set of stimulus signals to the electrochemical sensor.

16. The method of claim 15 further comprising:

receiving an environmental attribute corresponding to at least one of a temperature value, a pressure value and a vibration value; and determining the predicted lifetime value dependent on the environmental attribute and the sensor degradation signature.

17. The method of claim 15 wherein the set of sensor parameters comprises a set of impedance values and wherein the sensor degradation signature comprises a plurality of sets of reference parameters and an associated time value.

18. The method of claim 17 further comprising in a sensor time prediction step:

generating the set of stimulus signals;

detecting the electrochemical sensor signal; and wherein the electrochemical sensor signal comprises a response of the electrochemical sensor to the set of stimulus signals.

19. The method of claim 18 further comprising:

determining a sensor health value from the set of impedance values;

comparing the sensor health value with a first threshold value and a second threshold value;

in response to the sensor health value being between the first and second threshold values, repeating the sensor time prediction step; and in response to the sensor health value being less than the second threshold value, indicating that the electrochemical sensor is invalid.

20. An electrochemical sensor measurement unit comprising:

a sensor degradation signature unit;

a processing unit coupled to the sensor degradation signature unit and further comprising:

a processor first input configured to be coupled to a sensor output of an electrochemical sensor;

a processor first output configured to be coupled to a sensor input of an electrochemical sensor; and wherein the processing unit is configured to:

apply a stimulus signal to the sensor input;

receive an electrochemical sensor signal via the sensor output;

determine at least one sensor parameter at one or more time values from the electrochemical sensor signal;

determine a predicted lifetime value corresponding to an expected remaining lifetime of the electrochemical sensor dependent on a sensor degradation signature, and the at least one sensor parameter;

a sensor parameter extraction module having a sensor parameter extraction output coupled to the processor first input, wherein the sensor parameter extraction module is configured to:

receive the electrochemical sensor signal;

extract at least one sensor parameter from the electrochemical sensor signal;

and provide the at least one sensor parameter to the processing unit; and a sensor fusion module configured to be coupled between a plurality of electrochemical sensors and the sensor parameter extraction module and configured to:

receive the electrochemical sensor signal from a first electrochemical sensor of the plurality of electrochemical sensors;

receive at least one further electrochemical sensor signal from a further electrochemical sensor of the plurality of electrochemical sensors; and provide the electrochemical sensor signal and the at least one further electrochemical sensor signal to the sensor parameter extraction module; and wherein the sensor degradation signature comprises at least one sensor degradation signature for each of the plurality of electrochemical sensors.

* * * * *